(12) United States Patent
Illsley et al.

(10) Patent No.: US 9,714,355 B2
(45) Date of Patent: Jul. 25, 2017

(54) LOW MIGRATION ENERGY CURABLE INKS

(71) Applicant: SUN CHEMICAL CORPORATION, Parsippany, NJ (US)

(72) Inventors: Derek Illsley, Bath (GB); Samuel Moncur, Clevedon (GB); Damian Ward, Radstock (GB); Stephen Hall, Wells (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 14/765,196

(22) PCT Filed: Jan. 30, 2014

(86) PCT No.: PCT/US2014/013800
§ 371 (c)(1),
(2) Date: Jul. 31, 2015

(87) PCT Pub. No.: WO2014/126720
PCT Pub. Date: Aug. 21, 2014

(65) Prior Publication Data
US 2015/0376424 A1    Dec. 31, 2015

Related U.S. Application Data

(60) Provisional application No. 61/765,149, filed on Feb. 15, 2013.

(51) Int. Cl.
| C09D 11/30 | (2014.01) |
| C08F 2/50 | (2006.01) |
| C09D 11/101 | (2014.01) |
| C09D 11/322 | (2014.01) |
| C09D 133/14 | (2006.01) |

(52) U.S. Cl.
CPC ............... *C09D 11/30* (2013.01); *C08F 2/50* (2013.01); *C09D 11/101* (2013.01); *C09D 11/322* (2013.01); *C09D 133/14* (2013.01)

(58) Field of Classification Search
CPC ..... C09D 11/30; C09D 11/101; B41M 5/5209
See application file for complete search history.

(56) References Cited

U.S. PATENT DOCUMENTS

| 8,372,913 B2 | 2/2013 | Claes et al. | |
| 8,563,624 B2 | 10/2013 | Claes et al. | |
| 8,940,811 B2 | 1/2015 | Claes et al. | |
| 2007/0289484 A1 | 12/2007 | Yamaguchi et al. | |
| 2009/0124720 A1* | 5/2009 | Tsuchiya .................. | C08F 2/48 522/182 |
| 2010/0304149 A1* | 12/2010 | Loccufier .................. | C08F 2/48 428/412 |
| 2012/0274717 A1 | 11/2012 | Nakano et al. | |
| 2015/0291819 A1* | 10/2015 | Mizutani ............... | C09D 11/101 428/207 |

FOREIGN PATENT DOCUMENTS

| EP | 2700509 A1 | 2/2014 |
| EP | 2832804 A1 | 2/2015 |
| EP | 2902456 A1 | 8/2015 |
| WO | WO-2009/053348 A1 | 4/2009 |
| WO | WO-2011/135089 A1 | 11/2011 |

OTHER PUBLICATIONS

Ciba Speciality Chemical, IRGACURE 127 Photoinitiator, 2004.*
European Search Report issued in European Application No. 14751033.3, dated Jan. 18, 2016.
International Preliminary Report issued in PCT/US2014/013800,dated Aug. 18, 2015.
International Search Report issued in PCT/US2014/013800, dated Jun. 16, 2014.
Marco Visconti, et al. "Difunctional Photoinitators." European Coatings Journal. May 2004. pp. 1-11.

* cited by examiner

*Primary Examiner* — Betelhem Shewareged
(74) *Attorney, Agent, or Firm* — Frost Brown Todd LLC

(57) ABSTRACT

Disclosed is a composition such as a pigmented free radical UV-curable inkjet liquid composition for the printing of food packaging materials, which when cured in ambient air produces minimal contamination of the foodstuff. This composition uses non-polymeric photoinitiators having molecular weights less than 500 amu that migrate at levels below the specified SML (specific migration limit).

28 Claims, 1 Drawing Sheet

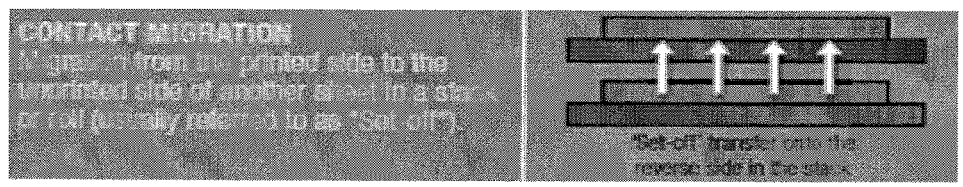

LOW MIGRATION ENERGY CURABLE INKS

CROSS REFERENCE TO RELATED APPLICATIONS

The present application is a §371 National Phase application based on PCT/US2014/013800 filed Jan. 30, 2014, which claims the benefit of U.S. Provisional Application Ser. No. 61/765,149, filed Feb. 15, 2013, all of which applications are incorporated herein by reference in their entirety and for all purposes.

FIELD OF THE INVENTION

The present invention relates to low viscosity pigmented inkjet compositions which are able to deliver low levels of migratables when UV-cured in ambient air at commercially acceptable UV-doses, by the use of low molecular weight, non-polymeric, monofunctional, difunctional (or trifunctional) photoinitiators having molecular weights below 500 amu.

BACKGROUND OF THE INVENTION

When radiation-curable inks and varnishes are applied to the (non-contact) surface of primary or secondary packaging intended for foodstuffs, then any contamination from the package impacting the foodstuff should fall within the guidelines set out by Article 3 of Regulation (EC) No 1935/20041, as recommended by EUPIA (European Printing Ink Association), requiring that materials and articles in contact with food to be "manufactured in accordance with good manufacturing practices, so that under normal or foreseeable conditions of use, they do not transfer their constituents to food in quantities which could: endanger human health; or bring about an unacceptable change in the composition of the food; or bring about a deterioration in the organoleptic characteristics thereof".

EUPIA has recommended that Article 3 of this provision be followed when producing printed matter for food packaging and has produced a detailed guideline for the selection of raw materials intended for printing inks for food packaging, along with guidelines on the testing of printed matter to ensure that regulatory requirements are achieved. In particular, it is a requirement of the inks of this invention, that when they are cured under the action of UV light that the level of contaminants arising from the cured ink film and reaching the foodstuff should fall below the specific migration limit for any material, in the instances where specific migration limits (SML) exist for those compounds. Where no SML exists for a specific component then the following migration limits apply: "A target migration limit of no concern for non-evaluated substances of 10 ppb is the ultimate objective, to be consistent with other food contact materials. In particular, a substance is acceptable if its specific migration does not exceed: 10 ppb, in case of insufficient toxicological data; 50 ppb if three negative mutagenicity tests requested by EFSA4 Guidelines are available; above 50 ppb, if supported by favorable toxicological data and/or evaluation done in *accordance with the EFSA Guidelines*" (Extract from EuPIA Guideline on Printing Inks applied to the non-food contact surface of food packaging materials and articles, September 2009)

EUPIA also provides guidelines on how to measure the potential level of migratables arising from printed matter. For inks applied to the non-food contact surface of packaging (i.e. the outer surface), whether that be to the primary packaging or secondary packaging (labels and sleeves) then the most likely route for migratable species from the ink contaminating the foodstuff is by what is known as set-off migration. This is where printed matter is stacked or reeled prior to it being filled with food. Thus, the ink comes into contact with what will be the food-contact surface of the package and migratable components of the ink can diffuse into this surface. When the package is then filled with foodstuff, the contaminants from the ink which have diffused into the contact-surface of the package can then leach into the food causing a potential contamination issue. This is shown in FIG. 1.

Thus, any UV-curable inkjet fluid which is applied to either the primary or secondary packaging of foodstuff should not result in contamination of that foodstuff at levels exceeding the limits detailed above.

It is predicted that UV-curable inkjet will become more prevalent in the food packaging sector, especially in the narrow web market where it will start to supplant more traditional printing methods such as UV flexo. This is the result of there being a drive to shorter print runs where the start-up costs of UV flexo and gravure become prohibitive. A particular market which is likely to be addressed by UV inkjet is the label and sleeve market.

The prior art identified describing radiation curable inkjet fluids having low migration potential includes WO2009/053348 which describes how UV-curable fluids having low migration potential can be formed by combining a specific blend of mono-, and difunctional acrylates, a polymerizable component containing both an acrylate and a vinyl ether group (specifically 'VEEA'; 2-(2-vinyloxyethoxy)ethyl acrylate), along with curable materials having greater than 3 polymerizable groups. It states that polymeric, polymerizable and multifunctional photoinitiators (PI's) may also be used. However, this patent publication does not adequately describe how to achieve sufficiently low migratables when inks are UV-cured under air and nor does it describe how to achieve inks having sufficiently low viscosity for the newer types of inkjet print-heads.

WO2009/030658 describes a blend of photoinitiators having a low migration potential, with the proviso that the compositions contain an aromatic polymerizable tertiary amine co-initiator. However, like WO2009/053348 this patent does not describe how to achieve acceptable migratable levels from pigmented inkjet fluids when cured in air.

It is commonly held that the approach to achieving low migratable UV-curable inks and varnishes (e.g. offset, flexo, gravure, inkjet) is to use a combination of polymeric photoinitiators along with lower concentrations of other photoinitiators, in such a combination that, when cured, the polymerized fluids (inks and varnishes) have sufficiently low concentrations of unreacted monomer and free photoinitiator that migrate into foods from printed packaging at levels below regulatory requirements. In Europe, the limits for most monomers migrating into foods are less than 10 ppb (1 ppb=1 μg/Kg(food)), unless a SML applies. In the case of photoinitiators, polymeric types are assumed not to migrate due to their high molecular weight, although SMLs of 50 ppb commonly apply (as a result of there being 3 independent mutagenic test results for the material).

However, the prior art does not teach any low migration UV-curable fluid, intended for the graphic arts and relying on the use of photoinitiators to bring about the polymerization of the unsaturated monomers, that do not contain polymeric or high molecular weight photoinitiators.

A significant advantage of using photoinitiators having theoretical molecular weights of less than 500 amu (atomic mass unit—determined using a simple mathematical equation based on the atomic mass of the constituents), especially in inkjet formulations, is that it allows low viscosity photopolymerizable fluids and especially inks to be produced. Because of this, they can furthermore allow higher pigmentation levels, which would be highly beneficial in graphics (packaging) applications and yet furthermore will also allow the incorporation of monomers, oligomers and other components having relatively high viscosities into the ink to provide extra benefit (e.g. alkoxylated tri-, and higher functional acrylates, polyurethane acrylates, epoxy acrylates, inert resins, etc.).

U.S. Pat. No. 8,217,095 describes UV-curable inkjet compositions comprising a blend of photoinitiators that can contain difunctional types including bis-phosphine oxide types and difunctional hydroxyketone types. However, the ink compositions contain a significant quantity of monofunctional monomer (11% (w/w)) which would likely lead to high levels of unreacted monomer and consequently high levels of migratable monomer and thence unacceptable contamination of any foodstuff contained within a food package printed with such an ink. Furthermore, the inks of this disclosure may also contain significant amounts of monofunctional photoinitiators which will also be prone to being unreacted and therefore available to cause contamination of any foodstuff. And, most significantly, the inks of this disclosure have not been demonstrated as being suitable for the printing of food packaging. Indeed, compositions prepared according to this disclosure result in unacceptable levels of migratable components from cured ink films, which would make them unsuitable for food packaging applications.

It is a surprising finding of the present invention that UV-curable inks having acceptable migratable levels can be produced by using only low molecular weight photoinitiators without recourse to polymeric or polymerizable photoinitiators.

The advantages over the prior art, particularly for UV-curable inkjet fluids cured in air, are clear. The approach described herein allows the formulation of pigmented inkjet products which when cured can produce levels of migratable species below their SMLs where they apply or of less than 10 ppb (as a level of contamination in a simulated foodstuff) for each potentially migratable component. Furthermore, the use of only low molecular weight (yet low migration potential) photoinitiators allows the preparation of low viscosity inks with acceptable pigmentation levels for the inkjet printing of material for graphics (packaging) applications. There is a drive to lower viscosities for inkjet products for instance, the KJ4A printhead (ex. Kyocera) has been found to require UV-curable inkjet fluids having viscosities of around 6.5 mPa·s at temperatures between 40-45° C. With typical pigmentation levels of greater than 2.5% (w/w) being necessary for single pass applications, this places a great deal of restriction on how to formulate UV-curable inkjet products which, when cured under air at acceptable press speeds (greater than 20 m/min), produce cured inks with levels of migratable components falling below regulatory requirements. In particular, it is highly desirable that the level of migratable monomer falls below the 10 ppb level. This would preclude the use of any significant amount of low viscosity monofunctional monomer in the ink; an approach used in other inkjet technologies to help reduce the viscosity, including that of U.S. Pat. No. 8,217,095. Indeed, U.S. Pat. No. 8,217,095 does not describe how such low viscosity inks can be obtained, let alone inks having the required low migration potential for the printing of food packaging.

WO2009/053348A1 does not describe how low viscosity inkjet products producing acceptable migratable levels when cured in air can be produced. Indeed, when inks have been prepared according to some of the examples of this application, they have been found to be high in viscosity, to have poor cure response when cured in air and to produce unacceptable levels of migratables even when cured at very high cure doses.

Inks prepared according to the prior art (WO2009/053348) have been shown to cure poorly in air and to produce high levels of migratables from cured ink films even when cured using high doses of UV-light. Inks prepared according to U.S. Pat. No. 8,217,095 have unacceptably high viscosity and are prone to producing high and unacceptable levels of migratable monomer. Furthermore, U.S. Pat. No. 8,217,095 does not sufficiently define the predominant use of low migration potential photoinitiators. Yet furthermore, inks prepared according to the prior art examples do not have sufficiently low viscosity for use in the newer printheads, including those from Kyocera. The prior art does mention that difunctional photoinitiators have low migration potential and low impact on viscosity but does not show how to prepare effective low migration inks that cure under air, using predominantly these types of photoinitiators. Indeed, the majority of the examples described in the prior art (WO2009/053348) were cured under nitrogen so as to exclude the oxygen which would otherwise cause inhibition of the cure and lead to higher levels of migratable material.

It has been shown by the present invention that it is possible to achieve low migratable levels by using predominantly only difunctional monomers and oligomers, whereas WO2009/053348 requires that when the concentration of mono- or difunctional (acrylate) monomers exceeds 24% (w/w) of the polymerizable content then they must also contain a proportion of tri-, and/or higher functional acrylates to deliver the required performance. An issue with using higher functional acrylates of this type is that they are generally higher in viscosity than low molecular weight difunctional acrylates such as DPGDA (dipropyleneglycol diacrylate), and would therefore tend to increase the viscosity of the resultant inkjet fluid. Therefore, for the low viscosity inkjet applications now becoming more common, their use would be restricted. Inkjet inks prepared according to the present invention can achieve acceptable migratable levels, at sufficiently low viscosity, by using only difunctional monomers.

As indicated above, the present invention relates to low viscosity pigmented inkjet compositions which are able to deliver low levels of migratables when UV-cured in ambient air at commercially acceptable UV-doses, by the use of low molecular weight, non-polymeric, monofunctional, difunctional (or trifunctional) photoinitiators having molecular weights below 500 amu. The prior art does not disclose any other UV-curable ink compositions which can achieve this solely by the use of such low molecular weight photoinitiators and they invariably incorporate what are known as polymeric photoinitiators where photoinitiator moieties such as thioxanthone, benzophenone and aminobenzoate are reacted onto a polymeric backbone. These polymeric backbones are usually poly(alkylene) oxides, such as poly(ethylene glycol), poly(propylene glycol), or polycarbonate diols, such as poly(caprolactone). These polymeric photoinitiators are diffusion restricted in UV-cured inks/varnishes thereby limiting the amount of these photoinitiators that can migrate from cured films and cause contamination of sensitive packaged produce such as food and pharmaceuticals.

A further advantage of the inks of the current invention is that, compared with those described in WO2009/053348, they do not require the incorporation of tri-, and higher, functional acrylates to deliver the required low migratable levels from UV-cured films, This is a distinct advantage in being able to deliver low viscosity fluids, as the higher functional acrylates tend to have higher viscosities than difunctional types. By not requiring the use of higher functional acrylates in substantial amounts as demonstrated in the prior art, Inkjet fluids having viscosities of less than 7.5 mPa·s at temperatures of 45° C. and lower can be readily achieved. Furthermore, the comparative examples COMP-1 to COMP-4 of WO2009/053348 which are photopolymerizable varnishes comprising VEEA and DPGDA with no higher functional monomers, indicate that cured films having low levels of migratable (or uncured material) cannot be achieved. This has clearly been demonstrated otherwise in the current invention.

SUMMARY OF THE INVENTION

The present invention provides a composition comprising at least one photoinitiator, wherein:
(a) at least 40% (w/w) of the total photoinitiator content comprises one or more photoinitiator having a molecular weight of less than 500 amu; and
(b) said composition is a free radical UV-curable composition.

The present invention also provides a printed article comprising the ink composition of the present invention.

The present invention further provides a method of printing an ink composition comprising applying to a substrate the ink composition of the present invention.

These and other objects, advantages, and features of the invention will become apparent to those persons skilled in the art upon reading the details of the methods and formulations as more fully described below.

BRIEF DESCRIPTION OF THE DRAWING

FIG. 1 shows contaminants from the ink which have diffused into the contact-surface of the package which can then leach into the food causing a potential contamination issue.

DETAILED DESCRIPTION OF THE INVENTION

The present invention relates to a composition, preferably a pigmented free radical UV-curable inkjet liquid composition for the printing of food packaging materials, which when cured in ambient air produces minimal contamination of the foodstuff (preferably less than 10 ppb of any single ink component). The inks use non-polymeric photoinitiators having molecular weights less than 500 amu that migrate at levels below the specified SML (specific migration limit). The inks are prepared by using one or more difunctional monomers to which might be optionally added mono-, tri, and higher functional acrylates.

Preferably, at least 40%, 50%, 60%, 70%, 80%, 90% or 100% (w/w) of the total photoinitiator content in the composition of the present invention comprises one or more photoinitiators having a molecular weight of less than 500 amu.

Also preferably, the composition of the present invention contains a colorant, more preferably the composition is an inkjet ink.

The present invention aims to address the issue of free-radically (UV) photopolymerizable inkjet compositions that when cured in ambient air result in ink films that cause minimal contamination of the packaged produce, especially foodstuffs. The inks of the present invention are able to cure sufficiently well with UV-doses of less than 300 mJ/cm² (medium pressure mercury H-Bulb), for example less than 250 mJ/cm², less than 200 mJ/cm², or less than 150 mJ/cm², such that the level of individual migratable monomer is preferably less than 10 ppb when assessed by a set-off food packaging migration test or less than the recognized specific migration limit for any ink component. The inks are primarily intended for the secondary food packaging market, that is the label and sleeve market, although the inks may also be applied to the non-contact surface of the primary packaging. The inks of the present invention could also be used in other packaging applications, such as for example pharmaceutical packaging.

Preferably, the photoinitiator having a molecular weight of less than 500 amu which is used in the composition of the present invention is selected from the group consisting of: bis-phosphine oxide, hydroxy-ketone types and combinations thereof.

More preferably, the bis-phosphine oxide photoinitiator has the following chemical structure:

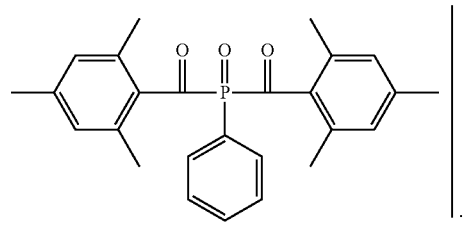

Also more preferably, the hydroxyl-ketone photoinitiator is a difunctional type, having the following structure:

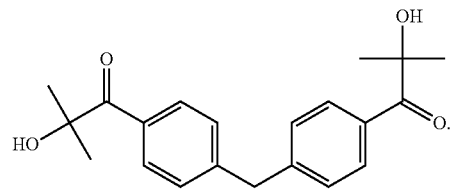 [SMILES: CC(C)(O)C(=O)c1ccc(Cc2ccc(C(=O)C(C)(C)O)cc2)cc1]

Again more preferably, the hydroxyl-ketone photoinitiator is a difunctional type, having the following structure:

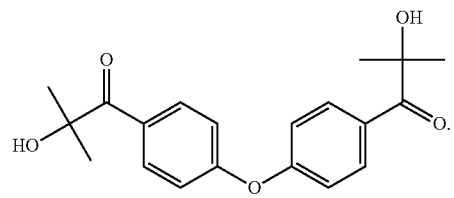 [SMILES: CC(C)(O)C(=O)c1ccc(Oc2ccc(C(=O)C(C)(C)O)cc2)cc1]

In a preferred embodiment, the inks of the present invention comprise difunctional phosphine oxide, Bis(2,4,6-trimethylbenzoyl)-phenylphosphineoxide, in combination with difunctional hydroxyl-ketone photoinitiators to deliver the required low migratable levels.

In another preferred embodiment, the total photoinitiator concentration is up to 6%, 8% or 10% (w/w) of the total composition content.

In another embodiment, the composition of the present invention contains polymerizable components, comprising of a blend of difunctional monomers. Preferably, less than 10% by weight of the polymerizable components is one or more monofunctional acrylate monomer. Also preferably, the polymerizable groups are selected from the group consisting of: acrylate, methacrylate, vinyl ether, allyl ether, maleate, fumarate, ethylenic, acrylamide, (meth)acrylamide and any other reactive group that is polymerizable by a free radical propagation process and a blend thereof.

In yet another embodiment of the present invention, the composition of the present invention contains polymerizable components, wherein greater than 50%, 75% or 90% by weight of the polymerizable components is a blend of difunctional monomers. It is also possible to have 100% of the polymerizable components consist of a blend of difunctional monomers.

In another embodiment, the polymerizable components of the ink may contain less than 10% or 5% (w/w) of any monofunctional acrylate monomer.

The composition of the present invention may also contain an acrylated amine and/or any blend of trifunctional, tetrafunctional, pentafunctional and hexafunctional acrylates. Preferably, the polymerizable groups used in the composition of the present invention are in a monomer or oligomer and comprise any blend of acrylate, methacrylate, vinyl ether, allyl ether, maleate, fumarate, ethylenic, acrylamide, (meth)acrylamide, or any other reactive group that is polymerizable by a free radical propagation process.

The composition of the present invention may also contain an inert resin such as an acrylic polymer.

A further aspect of the present invention is that the compositions and inks preferably have viscosities of less than 7.5 mPa·s at 40-45° C., with pigment concentrations of greater than 2.5% (w/w). Also preferably, the compositions and inks of the present invention have viscosities less than 12.0 mPa·s at 50° C., less than 8.0 mPa·s at 45° C., less than 7.0 mPa·s at 45° C., less than 8.0 mPa·s at 40° C. and less than 7.0 mPa·s at 40° C. This is preferably achieved by using mainly difunctional monomers, such as for example DPGDA (dipropylene glycol diacrylate), NPG(PO)DA (propoxylated neopentyl glycol diacrylate), MPDA (3-methyl pentanediol diacrylate) and VEEA (2-(2-vinyloxyethoxy)ethyl acrylate), along with photoinitiators having molecular weights of less than 500 amu. These photoinitiators include those contained in, or to be introduced into at a future date, EUPIA's (European Printing Ink Association) suitability list of photoinitiators for low migration UV Printing Inks and Varnishes. Particularly favored photoinitiators include phenyl bis(2,4,6-trimethylbenzoyl) phosphine oxide ('Irgacure 819', Cas. No. 162881-26-7); SML=3.3 mg/Kg), difunctional hydroxyl ketone types such as Irgacure 127 (Cas. No. 474510-57-1; SML=0.05 mg/Kg) and Escure KIP160 (Cas. No. 71868-15-0).

The cure response of the inks and a further lowering of the monomer migratables can optionally be achieved by the inclusion of suitable co-initiators such as acrylated amines (e.g. CN3715LM, ex. Sartomer) and non-polymeric aminobenzoates, such as 2-ethylhexyl-4-dimethylaminobenzoate. Low concentrations of polymeric photoinitiators may be included into the ink compositions so long as their incorporation does not prevent the preparation of inks having acceptable low viscosity with pigment concentrations in the ink of greater than 2.5% (w/w). The concentration of all polymeric photoinitiators should preferably not exceed 50% (w/w) and more preferably should not exceed 20% (w/w) of the total photoinitiator composition of the ink.

Free radically polymerizable, low migration potential, UV-curable pigmented inkjet fluids are formed by the use of non-polymeric photoinitiators having molecular weights of less than 500 amu, in combination with any blend of mono-, di-, tri-, tetra-, and higher functional monomers such that when 4-16 µm films are applied to a packaging substrate and subsequently cured under UV-light at an intensity of less than 250 mJ/cm2, the level of migratable species, as determined by a simulated set-off migration test, is less than 10 ppb for each individual monomer and below the specific migration limit for the photoinitiators used. In a further embodiment, pigmented UV-curable inkjet fluids having viscosities of less than 7.5 mPa·s at 40-45° C. are also described, where the pigment concentration in the ink is greater than 2.0% (w/w), and preferably greater than 2.5% (w/w). It should be noted that higher intensity UV light could be used to cure the inks of the present invention, but this would typically lead to slower press speeds and higher energy requirements. Thus, a preferred embodiment of the present invention is that the inks will exhibit low migratables (<10 ppb) at lower UV intensity (<250 mJ/cm$^2$).

A further and very significant advantage of using non-polymeric photoinitiators in inkjet inks is that they do not impact the viscosity to the same extent as polymeric types. This is particularly advantageous for inks destined for printheads requiring low viscosity fluids, like the KJ4A series printheads from Kyocera which require inks having viscosities of 7.0 mPa·s or lower at 40-45° C.

Preferably, inks prepared according to the present invention can also achieve acceptably low migratable levels of monomer through blends of only difunctional monomers such as DPGDA. This is a surprising finding in light of the prior art (WO2009/053348A1), which otherwise teaches that with an ink/varnish for inkjet application containing any blend of difunctional acrylate monomers in excess of 24% of the polymerizable component then requires the incorporation of tri-, and higher functional (acrylate) monomers. Indeed, it has been found that when inks are prepared according to the present invention using only blends of difunctional monomers, it is possible to achieve levels of total migratable monomer of less than 10 ppb when the inks are cured in ambient air with cure doses of less than 250 mJ/cm2, by a migration test following the guidelines set out by the EUPIA.

There is no particular restriction on what monomers and oligomers can be used so long as that when incorporated into the ink they allow the required viscosity and migratable limits to be achieved. In the case of monofunctional monomers, such as lauryl acrylate (SML=50 ppb) and tridecyl acrylate (non-evaluated substance, therefore the migration limit=10 ppb), it is preferred that the concentration be kept below 10% (w/w), and more preferably below 5% (w/w) of the total ink composition to ensure that the migratable level of the unreacted material in a cured ink film that could migrate into a foodstuff as a result of set-of migration is less than the migration limit for that material.

Preferably, more than 50% (w/w) and, even more preferably more than 80% (w/w) of the total photoinitiator composition of the ink should be formed of photoinitiators having molecular weights of less than 500 amu, and that they appear on current and future approved lists for use in UV-curable inks for low migration purposes as set out by EUPIA. It is preferred that these photoinitiators should be either di-, or trifunctional with respect to the photoinitiator groups. This helps to ensure that the photoinitiators become bound into the UV-cured ink film after the photopolymerization process. Particularly preferred photoinitiators include, but are not limited to; phenyl bis(2,4,6-trimethylbenzoyl) phosphine oxide ('Irgacure 819', Cas. No. 162881-26-7); SML=3.3 mg/Kg), difunctional hydroxyl ketone types such as Irgacure 127 (Cas. No. 474510-57-1; SML=0.05 mg/Kg) and Esacure KIP160 (Cas. No. 71868-15-0). Clearly, as other non-polymeric low molecular weight photoinitiators having low migration potential come onto the market, they could be used in pigmented inkjet fluids prepared according to the present invention.

A further benefit of the present invention is that by formulating inks with photoinitiators of the type described in the preceding paragraph, more efficient cure can be achieved since on a weight-for-weight basis compared with polymeric photoinitiators, a higher concentration of photoinitiator chromophore can be incorporated into the ink. Therefore, lower overall photoinitiator concentrations need to be used to deliver the same degree of cure and thence the same level of low migratables (see Table 4).

Inks formulated in accordance with the present invention may also contain other components which enable them to perform in their intended application. These other ink components include, but are not restricted to; stabilizers, wetting aids, slip agents, inert resins, antifoams, fillers, rheological aids, etc.

The compositions and inks of the present invention can be applied to the non-food contact surface of food packaging including primary and secondary food packaging. The compositions and inks of the present invention can be applied to the surface of a plastic film, paper or paperboard substrate. The plastic film can be any of the following; polyester, polyethylene, polypropylene, polyamide, poly(lactic acid), a cellulose film and any coated or pretreated film thereof. The plastic film can be of a flexible or rigid type and can have a thickness of less than or greater than 100 µm. A printed plastic film may subsequently be laminated to a second or more plastic film, to form a printed laminate film suitable for food packaging. A printed paper or paperboard substrate may subsequently be laminated to a second or more plastic film, to form a printed laminate suitable for food packaging.

The invention is further described by the examples given below. It should be noted that even though the examples are all ink-jet inks, the inks of the present invention could be modified to meet the viscosity and rheology requirements of other print processes, such as for example, flexographic, gravure, screen, litho, spray, etc.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples illustrate specific aspects of the present invention and are not intended to limit the scope thereof in any respect and should not be so construed.

Ink Preparation

All inks were prepared by mixing the pigment dispersion with the ink components using a Silverson type disperser for 20 minutes. The inks were then filtered to remove any oversized particles that might be present in the ink.

Viscosity Measurements

The viscosity of the inks were measured using a Brookfield DV-II+ Pro Viscometer equipped with Spindle no. 18, at 100 rpm.

UV-Cure Response

The cure response of the inks was determined by applying 8 µm films (for the black inks) and 12 nm films (for the other colors) to Leneta opacity charts (Form 2A) using calibrated K-Bars (ex. RK Print). The coated charts were then passed through a Fusion UV Systems UV-Rig equipped with a medium pressure H-bulb. The belt speed was adjusted so that the UV-dose, as measured by a calibrated International Light Technologies ILT 490 Profiling Belt Radiometer (covering the UV-A and UV-B ranges), was about 50 mJ/cm$^2$. The number of passes through the rig to achieve both surface and through cure were then recorded allowing the UV-dose level to achieve cure to be determined. The surface cure was assessed by gently drawing a cotton wool bud across the surface of the print, full cure being determined as being the point at which no surface defects were observed. Through cure was assessed by dragging a 1.5 mm wide wooden dowel across the surface of the ink with an approximate downward load of about 5 Kg. Through cure was determined as being the point at which the dowel was not able to penetrate through to the underlying surface of the Leneta Chart.

Curing the Inks for Migration Testing

The inks were applied to 36 nm Melinex S (a polyester film) at either 8 nm for the black inks or at 12 nm for the other colors. The inks were then cured at specific UV-doses through the UV-rig described previously. The prints were then stacked for 2 hours before performing the migration test described below.

Assessing the Level of Migratable Species

The level of contamination from a print surface was determined by a 'set-off' migration test. This test involved blocking 90 cm$^2$ of the printed surface to a 30 micron sheet of LDPE (low density poly(ethene)), at 10 tons for a period of 72 hours. The poly(ethene) film was then extracted into 2 ml of methanol, containing 0.025% (w/w) of MEHQ (stabilizer) for 3 hours before the methanol solution was analyzed by GC-MS. The GC-MS was calibrated with known solutions of the analytes (monomers, oligomers, photoinitiators and photoinitiator decomposition products) and the results are reported as ppb, the amount of migratable material that would be present in 1 kg of food according to the EU packaging model, where it is assumed that 600 cm$^2$ of substrate is required to package 1 kg of food.

Comparative Examples 1 & 2

Inkjet inks were prepared with similar compositions to the examples INV-55 and INV-56 of WO2009/053348, and evaluated according to the procedures described above.

TABLE 1*

Comparative Examples 1 and 3 formulations and test results.

| Material | Ex. 1 (Comparative) | Ex. 2 (Comparative) |
|---|---|---|
| VEEA | 56.6 | 58.6 |
| SR399 | 20.0 | 20.0 |
| Irgacure 127 | 2.5 | 2.5 |
| Genopol TX | 2.5 | — |

TABLE 1*-continued

Comparative Examples 1 and 3 formulations and test results.

| Material | Ex. 1 (Comparative) | Ex. 2 (Comparative) |
|---|---|---|
| Genopol AB1 | 5.0 | — |
| Genorad 16 | 1.0 | 1.0 |
| TegoGlide 410 | 0.4 | 0.4 |
| Cyan Dispersion A | 12.0 | — |
| Magenta Dispersion A | — | 17.5 |
| Total | 100.0 | 100.0 |
| Test Results | | |
| Viscosity @ 45° C. (mPa · s) | 11.2 | 8.07 |
| Viscosity @ 50° C. (mPa · s) | 9.63 | 7.08 |
| Surface Cure (mJ/cm$^2$) | 150-200 | >500 |
| Through Cure (mJ/cm$^2$) | 200-250 | 250 |
| Migratable Results (ppb) | | |
| UV-Dose | 225 mJ/cm$^2$ | 225 mJ/cm$^2$ | 675 mJ/cm$^2$ |
| VEEA | 142 | 1010 | 27 |
| NPG(PO)DA | 3.4 | — | — |
| DPGDA | — | 360 | 132 |

*Notes to Table 1
VEEA = 2-(2-vinyloxyethoxy)ethyl acrylate
SR399 = Dipentaerythritol pentaacrylate (ex. Sartomer)
Genopol TX = Polymeric Thioxanthone (ex. Rahn)
Genopol AB1 = Polymeric aminobenzoate (ex. Rahn)
NPG(PO)DA = Propoxylated neopentylglycol diacrylate
DPGDA = Dipropylene glycol diacrylate
Cyan Dispersion A = a dispersion containing 25.0% (w/w) of Pigment Blue 15:4, the remainder comprising the dispersant (Efka 7476), stabilizers and NPG(PO)DA
Magenta Dispersion A = a dispersion containing 21.0% (w/w) of Pigment Red122, the remainder comprising the dispersant (Solsperse 39000), stabilizers, and DPGDA Table 1 shows that when typical prior art ink and coating formulations, based on high MW photoinitiators (>500 amu) are made into inkjet inks, the resultant inkjet inks do not meet the <10 ppb migratables threshold, even at relatively high level of UV intensity.

Comparative Example 3 & Inventive Example 4

Inkjet inks were prepared according to the formulations described in Table 2 and evaluated according to the procedures described above.

TABLE 2*

Comparative Inkjet Ink Example 3 & Inventive Inkjet Ink Example 4 formulations and test results.

| Material | Ex. 3 (Comparative) | Ex. 4 (Inventive) |
|---|---|---|
| DPGDA | 14.9 | 14.9 |
| 3-MePDDA | 25.0 | 30.0 |
| VEEA | 35.0 | 35.0 |
| CN3715LM | 2.0 | 2.5 |
| Genopol TX | 4.7 | — |
| Omnipol BP | 2.0 | — |
| Genopol AB1 | 1.0 | — |
| Irgacure 819 | 2.3 | 3.0 |
| Esacure KIP160 | 2.5 | 3.0 |
| Irgacure 127 | — | 1.0 |
| Genorad 16 | 1.0 | 1.0 |
| Ethanox 4703 | 0.2 | 0.2 |
| TegoGlide 410 | 0.4 | 0.4 |
| Black Dispersion 1 | 9.0 | 9.0 |
| Total | 100.0 | 100.0 |

TABLE 2*-continued

Comparative Inkjet Ink Example 3 & Inventive Inkjet Ink Example 4 formulations and test results.

| Material | Ex. 3 (Comparative) | Ex. 4 (Inventive) |
|---|---|---|
| Test Results | | |
| Viscosity @ 45° C. (mPa · s) | 9.78 | 6.21 |
| Viscosity @ 50° C. (mPa · s) | — | — |
| Surface Cure (mJ/cm$^2$) | 100 | 100 |
| Through Cure (mJ/cm$^2$) | 100-150 | 100-150 |
| Migratable Results (ppb @ UV-Dose = 225 mJ/cm$^2$) | | |
| DPGDA | 0.8 | 1.6 |
| 3-MePDDA | 0.9 | 2.4 |
| VEEA | 5.8 | 5.1 |
| Mesitaldehyde | 3.1 | 1.7 |
| Pigment Particle Size Results (D100) | | |
| | 0.4 μm | 0.4 μm |

*Notes to Table 2
3-MePDDA = 3-Methylpentanediol diacrylate (SR341, ex. Sartomer)
CN3715LM = An acrylated amine (ex. Sartomer)
Omnipol BP = Polymeric Benzophenone (ex. IGM Resins)
Black Dispersion 1 = a dispersion containing 28% (w/w) of Pigment Black 250, the remainder comprising the dispersant (Efka 7701), stabilizers and DPGDA.
Mesitaldehyde = A photodecomposition by-product of Irgacure 819

Table 2 shows that it is possible to formulate an ink based predominantly on polymeric photoinitiators (Comparative Example 3) that will pass the migratables threshold (<10 ppb) but at a relatively high viscosity which is not suitable for many inkjet printheads. Whereas Inventive Example 4, which is based solely on non-polymeric, low MW photoinitiators, not only passes the migratables threshold, but also has a considerably lower viscosity, making it more suitable for use in inkjet printheads. This is important as the inkjet printing industry is trending more and more towards low viscosity inks.

Inventive Examples 5-8

Inkjet inks were prepared according to the formulations described in Table 3 and evaluated according to the procedures described above.

TABLE 3

Inventive Inkjet Ink Examples 5-8 formulations and test results.

| | Ex. 5 (Inventive) | Ex. 6 (Inventive) | Ex. 7 (Inventive) | Ex. 8 (Inventive) |
|---|---|---|---|---|
| DPGDA | 13.5 | 15.4 | 16.9 | 15.4 |
| 3-MePDDA | 24.9 | 25.0 | 25.0 | 30.0 |
| VEEA | 40.0 | 35.0 | 30.0 | 35.0 |
| CN3715LM | 2.0 | 2.0 | 2.0 | 2.0 |
| Irgacure 819 | 3.0 | 3.0 | 3.0 | 3.0 |
| Esacure KIP160 | 2.5 | 3.0 | 3.0 | 3.0 |
| Irgacure 127 | 1.5 | 1.0 | 1.0 | 1.0 |
| Genorad 16 | 1.0 | 1.0 | 1.0 | 1.0 |
| Ethanox 4703 | 0.2 | 0.2 | 0.2 | 0.2 |
| TegoGlide 410 | 0.4 | 0.4 | 0.4 | 0.4 |
| Cyan Dispersion A | 11.0 | 14.0 | — | — |
| Magenta Dispersion | — | — | 17.5 | — |
| Black Dispersion 1 | — | — | — | 9.0 |
| Total | 100.0 | 100.0 | 100.0 | 100.0 |
| Migratable Components | | | | |
| Viscosity @ 45° C. (mPa · s) | 5.28 | 5.88 | 6.39 | 6.21 |
| Surface Cure (mJ/cm$^2$) | 100 | 100 | 100 | 100-150 |

TABLE 3-continued

Inventive Inkjet Ink Examples 5-8 formulations and test results.

|  | Ex. 5 (Inventive) | Ex. 6 (Inventive) | Ex. 7 (Inventive) | Ex. 8 (Inventive) |
|---|---|---|---|---|
| Through Cure (mJ/cm$^2$) | 100 | 100 | 100 | 100-150 |
| NPG(PO)DA | <0.5 | 2.5 | — | — |
| DPGDA | <0.5 | 0.9 | <0.5 | 0.8 |
| 3-MePDDA | <0.5 | 0.7 | <0.5 | 1.2 |
| VEEA | 0.5 | <0.5 | <0.5 | 0.6 |
| Mesitaldehyde | 5.9 | 2.1 | 7.9 | 1.5 |

Example 5 shows that an ink based solely on non-polymeric, low migration photoinitiators has a low viscosity and low levels of migratables, while maintaining good cure. The low viscosity of Example 5 makes it especially suitable for many of the newer printheads (e.g. Kyocera 4JA). Example 6 shows that it is possible to prepare inks having considerably higher pigmentation levels (in this case a cyan ink having 3.5% (w/w) of pigment) with inks based on non-polymeric photoinitiators whilst maintaining acceptable viscosity and low migratables. Examples 7 and 8 demonstrate magenta and black inks having acceptable pigmentation levels and generating low migratable levels. Inventive Examples 5-8 also show how inks having low levels of migratables can be prepared using predominantly difunctional monomers.

Comparative Examples 9-11 and Inventive Examples 12-16

Inkjet inks were prepared according to the formulations described in Table 4 and evaluated according to the procedures described above.

The results in Table 4 show that the level of migratable components from cured ink films falls significantly as the proportion of non-polymeric photoinitiator increases. Example 9 is based on 100% polymeric photoinitiators (w/w) of the total photoinitiator content and exhibits high levels of migratables. Examples 10 and 11 are based on 30% and 40% of the total photoinitiator content comprising non-polymeric photoinitiators and exhibit lower levels of migratables, though not less than 10 ppb. Examples 12-16 are based on 50%, 60%, 80%, 90% and 100% of non-polymeric photoinitiators respectively and all exhibit migratables of less than 10 ppb with cure speeds faster than Examples 9, 10 and 11. Examples 14-16 show that even with a photoinitiator concentration in the ink of only 6.0% (w/w) it is still possible to achieve migratables of less than 10 ppb and fast cure in a cured ink film where the majority of the photoinitiator component is made up of non-polymeric photoinitiators having low migration potential.

In a further experiment, the ink according to Example 13 was cured at 200 mJ/cm$^2$. The migratable components from this cured ink film were determined as 2.8 ppb, 2.9 ppb, 0.5 ppb and 0.5 ppb for NPG(PO)DA, DPGDA, VEEA and mesitaldehyde respectively. This demonstrates that sufficiently low migratable levels can be achieved with inks prepared according to the invention at cure doses down to at least 200 mJ/cm$^2$, a significant advance over other UV-curable inkjet inks revealed in the prior art.

The inks of the present invention are not limited to the colorants contained in the examples. Suitable colorants include, but are not limited to organic or inorganic pigments and dyes, as well as effect pigments and metallic pigments, etc. The dyes include but are not limited to azo dyes, anthraquinone dyes, xanthene dyes, azine dyes, combinations thereof and the like. The inks of the present invention

TABLE 4*

Comparative Inkjet Ink Examples 9-11 & Inventive Inkjet Ink Examples 12-16 formulations Containing Varying Blends of Polymeric and Non-Polymeric Photoinitiators and test results.

|  | Ex. 9 (Comparative) | Ex. 10 (Comparative) | Ex. 11 (Comparative) | Ex. 12 (Inventive) | Ex. 13 (Inventive) | Ex. 14 (Inventive) | Ex. 15 (Inventive) | Ex. 16 (Inventive) |
|---|---|---|---|---|---|---|---|---|
| DPGDA | 41.9 | 41.9 | 41.9 | 41.9 | 41.9 | 43.9 | 43.9 | 43.9 |
| VEEA | 35.0 | 35.0 | 35.0 | 35.0 | 35.0 | 35.0 | 35.0 | 35.0 |
| CN3715LM | 2.5 | 2.5 | 2.5 | 2.5 | 2.5 | 2.5 | 2.5 | 2.5 |
| Genopol TX | 5.5 | 3.85 | 3.3 | 3.3 | 2.2 | 0.825 | 0.41 | 0 |
| Omnipol BP | 2.5 | 1.75 | 1.5 | 1.5 | 1.0 | 0.375 | 0.19 | 0 |
| Irgacure 819 | 0 | 1.2 | 1.6 | 1.6 | 2.4 | 2.4 | 2.7 | 3.0 |
| Irgacure 127 | 0 | 1.2 | 1.6 | 1.6 | 2.4 | 2.4 | 2.7 | 3.0 |
| Genorad 16 | 1.0 | 1.0 | 1.0 | 1.0 | 1.0 | 1.0 | 1.0 | 1.0 |
| Ethanox 703 | 0.2 | 0.2 | 0.2 | 0.2 | 0.2 | 0.2 | 0.2 | 0.2 |
| TegoGlide 410 | 0.4 | 0.4 | 0.4 | 0.4 | 0.4 | 0.4 | 0.4 | 0.4 |
| Cyan Dispersion A | 11.0 | 11.0 | 11.0 | 11.0 | 11.0 | 11.0 | 11.0 | 11.0 |
| Total | 100 | 100 | 100 | 100 | 100 | 100 | 100 | 100 |
| Total Photoinitiator Conc. % (w/w) | 8.0 | 8.0 | 8.0 | 8.0 | 8.0 | 6.0 | 6.0 | 6.0 |
| % (w/w) non-polymeric Photoinitiators (MW < 500) | 0 | 30 | 40 | 50 | 60 | 80 | 90 | 100 |
| Test Reults | | | | | | | | |
| Viscosity @ 45° C. (mPa · s) | 8.35 | 7.85 | 7.72 | 7.53 | 7.43 | 6.94 | 6.73 | 6.63 |
| Surface Cure (mJ/cm$^2$) | 400 | 150-200 | 150 | 100 | 100 | 100-150 | 100-150 | 100-150 |
| Through Cure (mJ/cm$^2$) | 400 | 100-150 | 100-150 | 100 | 100 | 50-100 | 50-100 | 50 |
| Migratable Components (12 μm ink films cured at 225 mJ/cm$^2$) (ppb) | | | | | | | | |
| NPG(PO)DA | 845 | 122 | 21.9 | 1.6 | 1.3 | 2.4 | 7.2 | 1.7 |
| DPGDA | 1680 | 180 | 22.1 | 2.5 | 2.1 | 2.9 | 5.4 | 1.8 |
| VEEA | 761 | 15.9 | 12.2 | 0.8 | <0.5 | <0.5 | 0.5 | <0.5 |
| Mesitaldehyde | 0 | 1.0 | 1.9 | 0.9 | <0.5 | 0.5 | 0.8 | <0.7 | could also be made without colorants and used in coating applications where colorants are not used.

All references cited herein are herein incorporated by reference in their entirety for all purposes.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the invention.

We claim:

1. An inkjet composition comprising at least one photoinitiator, polymerizable components, and a multifunctional amino acrylate having a total functionality of greater than 2 wherein:
   (a) at least 40% (w/w) of the total photoinitiator content comprises one or more photoinitiator having a molecular weight of less than 500 amu;
   (b) said composition is a free radical UV-curable composition; and
   (c) wherein greater than 50% by weight of the polymerizable component is a blend of difunctional monomers.

2. The composition of claim 1, wherein at least 80% (w/w) of the total photoinitiator content comprises the one or more photoinitiator having the molecular weight of less than 500 amu.

3. The composition of claim 1, wherein 100% (w/w) of the total photoinitiator content comprises the one or more photoinitiator having the molecular weight of less than 500 amu.

4. The composition of claim 1 further comprising a colorant.

5. The composition of claim 1 being an ink.

6. The composition of claim 1 being an inkjet ink.

7. The composition of claim 1 which when cured with a UV-dose of up to 300 mJ/cm$^2$ in air, causes contamination of any foodstuff, resulting from unbound components of the composition, of less than 10 ppb of each individual component or of less than a recognized specific migration limit for any composition component.

8. The composition of claim 1, wherein the at least one photoinitiator having the molecular weight of less than 500 amu is selected from bis-phosphine oxide photoinitiatior, hydroxy-ketone photoinitiatior and combination or blend thereof.

9. The composition of claim 8, wherein the bis-phosphine oxide photoinitiator has the following chemical structure:

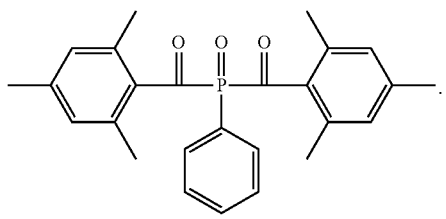

10. The composition of claim 8, wherein the hydroxyl-ketone photoinitiator is a difunctional hydroxy-ketone photoinitiatior, having the following structure:

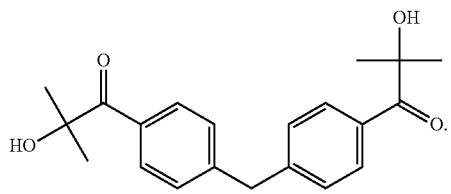 [SMILES: CC(C)(O)C(=O)c1ccc(Cc2ccc(C(=O)C(C)(C)O)cc2)cc1]

11. The composition of claim 8, wherein the hydroxyl-ketone photoinitiator is a difunctional hydroxy-ketone photoinitiatior, having the following structure:

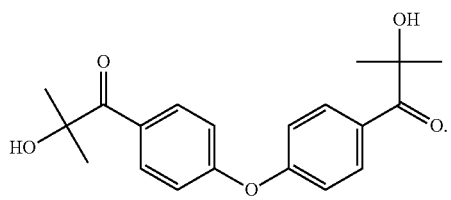 [SMILES: CC(C)(O)C(=O)c1ccc(Oc2ccc(C(=O)C(C)(C)O)cc2)cc1]

12. The composition of claim 1, wherein the total photoinitiator content is up to 10% (w/w) of total composition content.

13. The composition of claim 1, wherein the total photoinitiator content is greater than 3.0% (w/w) of total composition content.

14. The composition of claim 1, wherein greater than 90% by weight of the polymerizable components is a blend of difunctional monomers.

15. The composition of claim 1, wherein greater than 95% by weight of the polymerizable components is a blend of difunctional monomers.

16. The composition of claim 1, wherein 100% by weight of the polymerizable components is a blend of difunctional monomers.

17. The composition of claim 1, wherein less than 10% by weight of the polymerizable components is one or more monofunctional acrylate monomer.

18. The composition of claim 1 further comprising oligomers and/or polymers with polymerizable groups, wherein the polymerizable groups are selected from acrylate, methacrylate, vinyl ether, allyl ether, propenyl ether, maleate, fumarate, ethylenic acrylamide, (meth)acrylamide, any other reactive group that is polymerizable by a free radical propagation process and a blend thereof.

19. The composition of claim 1 having a viscosity of less than 12.0 mPa·s at 50° C.

20. The composition of claim 1 having a viscosity of less than 11.0 mPa·s at 45° C.

21. The composition of claim 1 having a viscosity of less than 7.5 mPa·s at 45° C.

22. A composition comprising the composition of claim 1 that has been cured in air.

23. A composition comprising the composition of claim 1 that has been cured with a UV-dose of less than 300 mJ/cm$^2$.

24. A printed article comprising the composition of claim 1.

25. The printed article of claim 24 which is a food package.

26. The printed article of claim 25, wherein the composition is applied to a surface of a plastic film for the food package.

27. The printed article of claim 25, wherein the ink is applied to a surface of a paper or paperboard substrate for the food package.

28. A method of printing an ink composition, comprising applying to a substrate the ink composition of claim 5.

* * * * *